(12) United States Patent
Mizikovsky (10) Patent No.: US 8,255,976 B2
(45) Date of Patent: Aug. 28, 2012

(54) PREVENTION OF A BIDDING-DOWN ATTACK IN A COMMUNICATION SYSTEM

(75) Inventor: Semyon B. Mizikovsky, Morganville, NJ (US)

(73) Assignee: Alcatel Lucent, Paris (FR)

( * ) Notice: Subject to any disclaimer, the term of this patent is extended or adjusted under 35 U.S.C. 154(b) by 758 days.

(21) Appl. No.: 12/323,615

(22) Filed: Nov. 26, 2008

(65) Prior Publication Data
US 2010/0130168 A1  May 27, 2010

(51) Int. Cl.
H04L 29/06 (2006.01)
(52) U.S. Cl. .............................. 726/3; 726/25; 713/171
(58) Field of Classification Search .................. 726/1–3, 726/11–15, 22, 26, 27; 713/168–170
See application file for complete search history.

(56) References Cited

U.S. PATENT DOCUMENTS

| 2008/0076420 A1 | 3/2008 | Khetawat et al. | |
| 2008/0076441 A1* | 3/2008 | Zhou | 455/452.2 |
| 2009/0080422 A1* | 3/2009 | Lee et al. | 370/389 |
| 2009/0119509 A1* | 5/2009 | Cho et al. | 713/171 |

FOREIGN PATENT DOCUMENTS

| WO | 2009/120122 A1 | 10/2009 |
| WO | PCT/US2009/064731 | 2/2010 |

OTHER PUBLICATIONS

3GPP TR 33.821, V0.1.0, 3rd Generation Partnership Project; Technical Specification Group Services and System Aspects; Rationale and Trace of Security Decisions in Long Term Evolved (LTE) RAN / 3GPP System Architecture Evolution (SAE), Release 8, Feb. 2007, 79 pages.
Nokia Corporation et al., "On Algorithms Negotiation and Bidding Down Attack," 3GPP TSG SA 2G3 Security, Release 8, Dec. 11-13, 2007, 5 pages, Sophia-Antipolis, France.
K. Thakare et al., "Initial Capability Negotiation Procedure for IEEE 802.16m," IEEE 802.16 Broadband Wireless Access Working Group, Sep. 2008, pp. 1-5.

* cited by examiner

Primary Examiner — Gilberto Barron, Jr.
Assistant Examiner — Malcolm Cribbs
(74) Attorney, Agent, or Firm — Ryan, Mason & Lewis, LLP (57) ABSTRACT

A communication system includes at least a mobile station, a base station, a gateway and a server, with the base station being configured for wireless communication with the mobile station, and the gateway being configured for connection between the base station and the server. The server stores information indicative of at least one established security capability of the mobile station, and sends at least a portion of that information to the gateway, possibly in conjunction with an authentication process for the mobile station. The gateway uses the information received from the server to verify that one or more security capabilities negotiated between the mobile station and the base station are consistent with the established security capability or capabilities of the mobile station. This can advantageously allow the gateway to prevent a bidding-down attack in which an attacker impersonates the mobile station to negotiate an inferior security capability with the base station.

20 Claims, 6 Drawing Sheets

MS SECURITY CAPABILITY

| TYPE | xxx | | |
|---|---|---|---|
| LENGTH | VARIABLE | | |
| VALUE | COMPOUND TLV | | |
| DESCRIPTION | MS SECURITY CAPABILITIES THAT CAN BE DELIVERED IN RADIUS ACCESS ACCEPT AND IN KEY_CHANGE_DIRECTIVE MESSAGE DURING THE INITIAL NETWORK ENTRY OF MS | | |
| ELEMENTS | TLV NAME | | M/O |
| | PKM VERSION SUPPORT | | M |
| | AUTHORIZATION POLICY SUPPORT | | M |
| | MAC MODE | | M |
| | PN WINDOW SIZE | | M |

PREVENTION OF A BIDDING-DOWN ATTACK IN A COMMUNICATION SYSTEM

FIELD OF THE INVENTION

The present invention relates generally to communication systems, and more particularly to techniques for ensuring security of communications within such systems.

BACKGROUND OF THE INVENTION

Communication systems are generally configured to operate in accordance with specified standards. For example, WiMAX systems, which provide broadband access to mobile users and other subscribers, are configured in accordance with IEEE Standard 802.16, described in document P802.16Rev2/D5, "Standard for Local and Metropolitan Area Networks, Part 16: Air Interface for Broadband Wireless Access Systems," June 2008, which is incorporated by reference herein. This standard specifies the air interface, including the medium access control layer (MAC) and physical layer (PHY), of combined fixed and mobile point-to-multipoint broadband wireless access (BWA) systems providing multiple services. Additional standards governing operation of WiMAX systems are described in WiMAX Forum documents, which are also incorporated by reference herein, including WiMAX Forum Network Architecture—Stage 3—Detailed Protocols and Procedures—Release 1, Version 1.2.3, July 2008.

The above-noted IEEE 802.16 and WiMAX Forum documents specify messaging protocols which are designed to ensure security of communications within a WiMAX system. However, the messaging protocols allow support for different levels of security, from strong security to low-level security to no security at all. Typically, a mobile station will negotiate a portion of its basic security capabilities with a base station before the mobile station is completely authenticated to the system. In a WiMAX system, this initial negotiation between mobile station and base station occurs through the exchange of Subscriber station Basic Capabilities (SBC) Request (REQ) and Response (RSP) messages. As part of this interaction, the mobile station will identify its basic security capabilities to the base station in an SBC-REQ message, and the base station will respond with an SBC-RSP message indicating which of these security capabilities of the mobile station are also supported by the base station and will therefore be utilized in subsequent security negotiations between them. This exchange of SBC-REQ and SBC-RSP messages takes place prior to execution of an Extensible Authentication Protocol (EAP) in which the mobile station authenticates itself to an Authentication, Authorization and Accounting (AAA) server of the WiMAX system via the base station and an authenticator of an Access Service Network (ASN) gateway.

A problem that can arise in an arrangement of the type described above is that it is vulnerable to what is known as a bidding-down attack. In such an attack, the attacker inserts itself between the mobile station and the base station, and impersonates the mobile station to negotiate inferior security capabilities with the base station that are below those actually supported by the mobile station. Once such reduced security is negotiated, the attacker can exploit this vulnerability to conduct additional attacks and to otherwise undermine the security of subsequent communications by the victim mobile station.

One known approach to preventing a bidding-down attack is to modify the messaging protocol such that the EAP authentication process occurs prior to the negotiation of basic security capabilities in the SBC-REQ and SBC-RSP messages. See K. Thakare et al., "Initial Capability Negotiation Procedure for IEEE 802.16m," IEEE 802.16 Broadband Wireless Access Working Group, September 2008. However, this approach is undesirable in that it would require a substantial change to the WiMAX standards, thereby necessitating costly changes to existing equipment.

SUMMARY OF THE INVENTION

The present invention in one or more illustrative embodiments provides techniques for preventing a bidding-down attack in a WiMAX system or other type of communication system. The techniques can be implemented in a simple and efficient manner within the framework of existing messaging protocols, and thus without the need for substantial changes to the WiMAX standards.

In accordance with one aspect of the invention, a communication system includes at least a mobile station, a base station, a gateway and a server. The base station is configured for wireless communication with the mobile station. The gateway is configured for connection between the base station and the server. The server stores information indicative of at least one established security capability of the mobile station, and sends at least a portion of that information to the gateway, possibly in conjunction with an authentication process for the mobile station. The gateway uses the information received from the server to verify that one or more security capabilities negotiated between the mobile station and the base station are consistent with the established security capability or capabilities of the mobile station. Such an arrangement is beneficial in that it allows the gateway to prevent a bidding-down attack in which an attacker impersonates the mobile station to negotiate an inferior security capability with the base station.

In accordance with another aspect of the invention, the gateway may send to the base station a message comprising at least a portion of the information indicative of at least one established security capability of the mobile station. The base station can then utilize the received information from the gateway to facilitate subsequent security negotiations between the base station and the mobile station. The message may comprise, for example, a message specifying the established security capabilities of the mobile station using an otherwise standard type-length-value (TLV) messaging format of a WiMAX communication system.

Advantageously, the illustrative embodiments can provide significantly improved security in WiMAX systems and other types of communication systems, without unduly increasing system cost or complexity.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for preventing bidding-down attacks in such systems. It should be understood, however, that the invention is not limited to use with the particular types of communication systems and attack prevention processes disclosed. The invention can be implemented in a wide variety of other communication systems, using alternative processing steps. For example, although illustrated in the context of WiMAX systems, the disclosed techniques can be adapted in a straightforward manner to a variety of other types of communication systems, including cellular systems, multiple-input multiple-output (MIMO) systems, Wi-Fi systems, etc.

Figure 1:
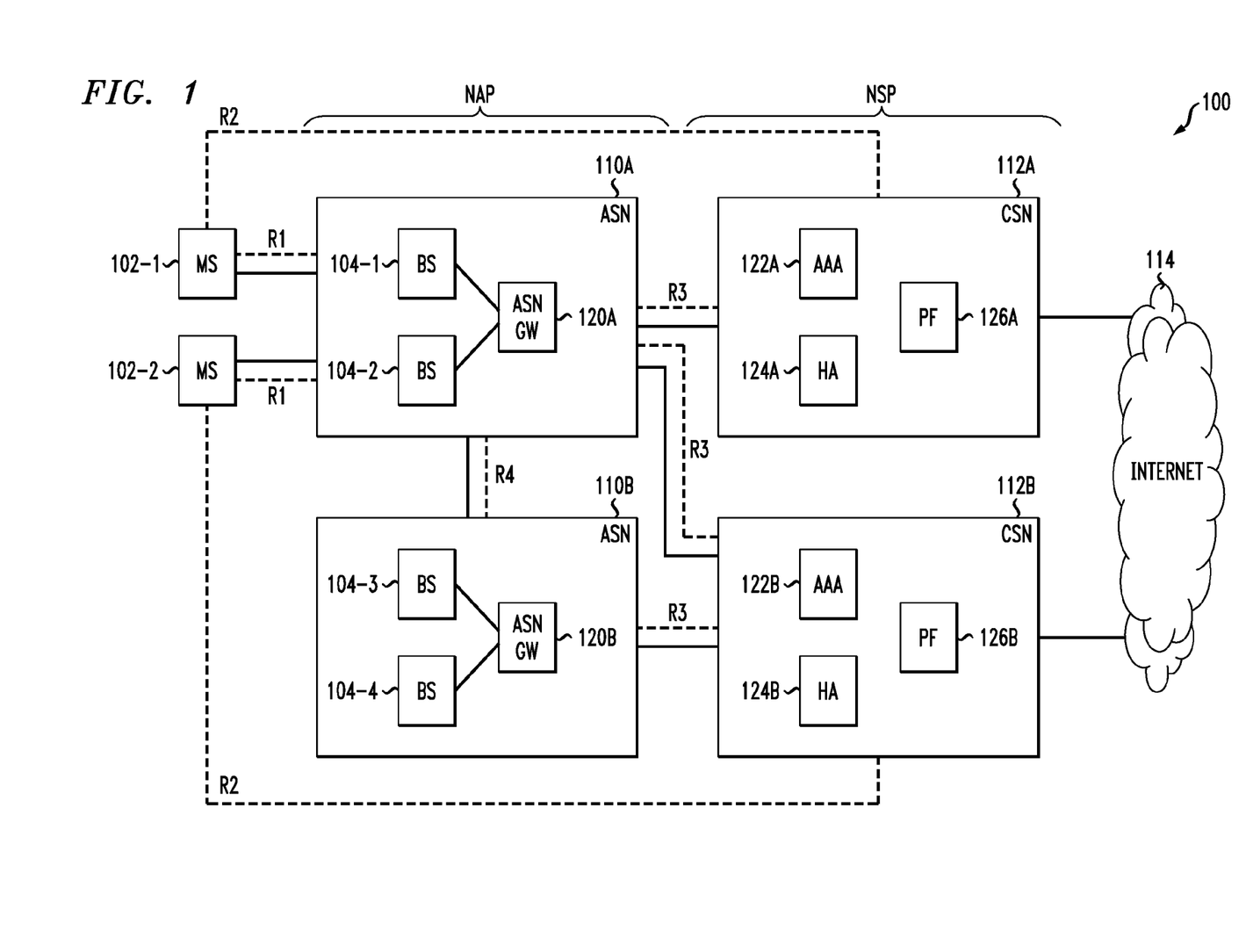
FIG. 1 is a block diagram of a communication system in an illustrative embodiment of the invention.

FIG. 1 shows a WiMAX communication system 100 comprising a plurality of mobile stations 102-1 and 102-2 and a plurality of base stations 104-1, 104-2, 104-3 and 104-4. The mobile stations are configured for wireless communication with the base stations via interfaces denoted R1. A given mobile station may comprise, by way of example, a mobile telephone, a computer, or any other type of communication device. The term "mobile station" as used herein is therefore intended to be construed broadly, so as to encompass a variety of different types of subscriber stations or, more generally, communication devices.

The base stations are associated with a Network Access Provider (NAP) portion of the system 100. This portion of the system includes Access Service Networks (ASNs) 110A and 110B. The ASNs 110 communicate with Connectivity Service Networks (CSNs) 112A and 112B in a Network Service Provider (NSP) portion of the system 100. The CSNs 112A and 112B are coupled to Internet 114.

The ASN 110A comprises the base stations 104-1 and 104-2, and an ASN gateway (GW) 120A. Similarly, the ASN 110B comprises the base stations 104-3 and 104-4, and an ASN gateway 120B.

The CSN 112A comprises an Authentication, Authorization and Accounting (AAA) server 112A, a Home Agent (HA) 124A, and a Policy Function (PF) element 126A. Similarly, the CSN 112B comprises an AAA server 112B, an HA 124B, and a PF element 126B. The PF elements 126A and 126B control Quality of Service (QoS) policies for connections involving the respective CSNs 112A and 112B.

For a given one of the mobile stations 102, one of the AAA servers 122A and 122B may be a home AAA server, while the other AAA server may be a visited AAA server.

The mobile stations 104-1 and 104-2 communicate with respective ones of the CSNs 112A and 112B via interfaces denoted R2.

The ASNs 110A and 110B communicate with the CSNs 112A and 112B via interfaces denoted R3.

Also, ASN 110A communicates with ASN 110B via an interface denoted R4.

Conventional aspects of the operation of the interfaces R1, R2, R3 and R4 are described in detail in the above-cited IEEE P802.16Rev2/D5 and WiMAX Forum documents. Solid line portions of these interfaces represent bearer plane communications, while dashed portions of these interfaces represent control plane communications.

The FIG. 1 arrangement is just one exemplary configuration of a WiMAX system, and numerous alternative configurations of system elements may be used. For example, although particular numbers of mobile stations 102, base stations 104, ASNs 110 and CSNs 112 are shown in the FIG. 1 embodiment, this is for simplicity and clarity of description only. A given alternative embodiment of the invention may of course include a larger or smaller number of such system elements.

As will be described in greater detail below, the present embodiment of the system 100 is configured such that a given one of the AAA servers 122, designated as a home AAA server for a particular mobile station 102, stores information indicative of at least one established security capability of that mobile station. In addition, the home AAA server sends at least a portion of the stored information to one of the ASN gateways 120 so as to enable the gateway to verify that one or more security capabilities negotiated between the particular mobile station and one of the base stations 104 are consistent with the established security capability or capabilities of the particular mobile station. The information may be sent from the home AAA server to the ASN gateway in conjunction with an authentication process for the mobile station, for example, after completion of an EAP authentication process.

This arrangement can advantageously enable the ASN gateway 120A or 120B to prevent a bidding-down attack in which an attacker impersonates the particular mobile station 102 to negotiate an inferior security capability with one of the base stations 104. An inferior security capability in this context refers to a security capability which is below that which the mobile station would otherwise be able to negotiate with the base station absent the presence of the attacker. This ability to prevent a bidding-down attack can be achieved in a simple and efficient manner within the framework of the existing WiMAX messaging protocols, and thus without the need for substantial changes to the WiMAX standards.

Figure 2:
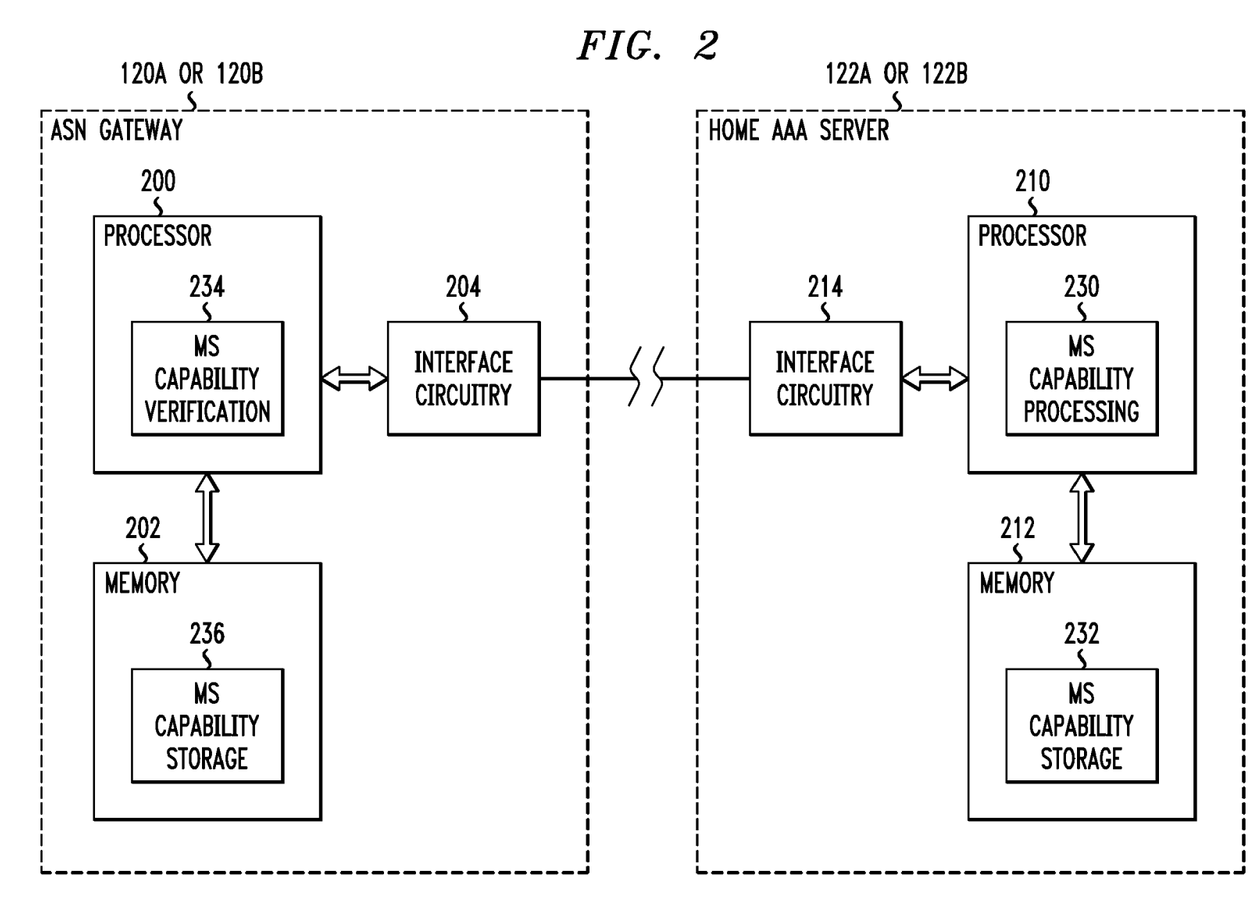
FIG. 2 shows a more detailed view of gateway and server elements in one possible implementation of the FIG. 1 system.

FIG. 2 shows a given ASN gateway 120A or 120B and its interface with a corresponding home AAA server 122A or 122B. The ASN gateway comprises a processor 200 coupled to a memory 202 and interface circuitry 204. Similarly, the home AAA server comprises a processor 210 coupled to a memory 212 and interface circuitry 214. The memories 202, 212 may be used to store respective sets of one or more software programs that are executed by the respective processors 200, 210 to implement the functionality of the ASN gateway and home AAA server as described herein. For example, message generation and other functionality as described in conjunction with FIGS. 3 and 4 may be implemented in a straightforward manner using software code executed by processors 200, 210. The memories 202, 212 are examples of what are more generally referred to herein as computer-readable storage media that store executable program code. The interface circuitry 204, 214 may comprise transceivers or other communication hardware or firmware that allows the ASN gateway 120A or 120B to communicate with one or both of the AAA servers 122A and 122B.

It is apparent from the FIG. 2 arrangement that a given ASN gateway 120 is configured for connection with a home AAA server 122, and vice-versa. Terms such as "connection," "connection between" and "coupled to" as used herein are intended to be construed generally, and accordingly should not be construed as requiring direct connection between the associated elements. Thus, ASN gateway 120 may be connected with home AAA server 122 in a given embodiment via one or more other system elements. Also, elements such as gateway 120 and server 122 need not be implemented on separate stand-alone processing platforms, but could instead, for example, represent different functional portions of a single common processing platform.

In order to implement the above-described bidding-down attack functionality, the home AAA server 122 is configured to include in processor 210 a mobile station security capability processing element 230. This element stores established mobile station capabilities for each of a plurality of mobile stations in a mobile station security capabilities portion 232 of memory 212. In addition, the ASN gateway 120 is configured to include in processor 200 a mobile station capability verification element 234, which compares for a given mobile station the established security capabilities as stored in the home AAA server with security capabilities negotiated between the mobile station and a base station. The memory 202 of ASN gateway 120 includes a mobile station capability storage portion 236 for supporting the verification performed by element 234. Processing elements such as 230 and 234 may be implemented at least in part in the form of software executed by the associated processors.

Figure 3:
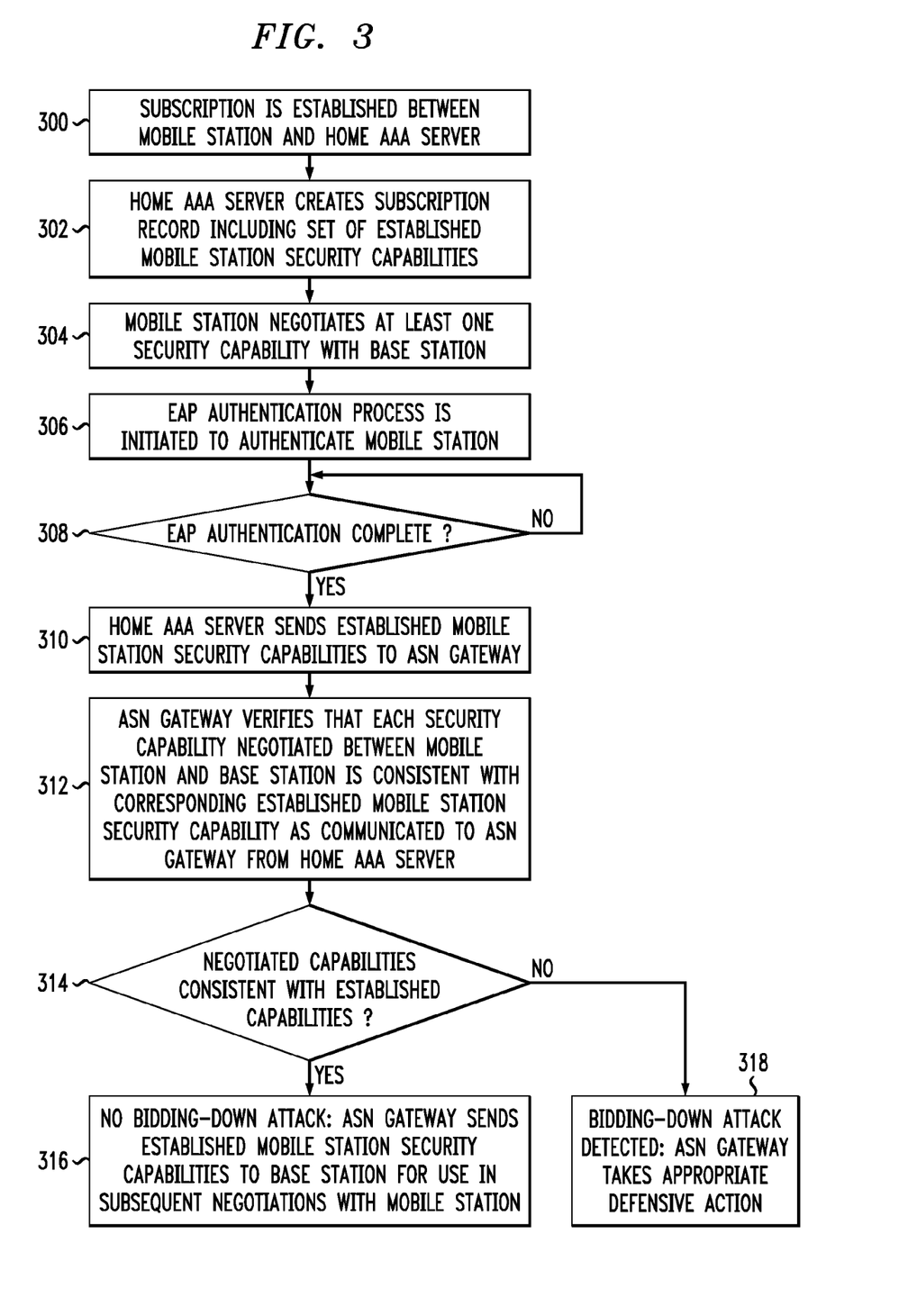
FIG. 3 is a flow diagram showing an exemplary process for preventing a bidding-down attack in the FIG. 1 system.

Referring now to FIG. 3, a process for preventing a bidding-down attack in the system 100 is shown. A more detailed example of this process will subsequently be described in conjunction with the messaging protocol diagram of FIG. 4. The process diagram of FIG. 3 includes steps 300 through 318, which generally involve interactions between a mobile station 102, base station 104, ASN gateway 120 and home AAA server 122 in the system 100. As indicated previously, one or more of these process steps may be implemented at least in part in the form of software executed in the corresponding system element, for example, in processors 200 and 210 of FIG. 2 in the case of operations associated with an ASN gateway 120 and home AAA server 122, respectively.

In step 300, a subscription is established between a particular mobile station 102 and its associated home AAA server 122. This subscription may be established in a conventional manner.

In step 302, the home AAA server 122 creates a subscription record that includes or otherwise identifies a set of established security capabilities for the corresponding mobile station 102. The established security capabilities are security capabilities that are supported by the particular mobile station, and may include, for example, one or more of a Privacy Key Management (PKM) version supported by the mobile station, an authorization policy supported by the mobile station, a message authentication code type supported by the mobile station, and an EAP authentication type supported by the mobile station. Each such security capability of the mobile station may be stored in the subscription record in the form of a corresponding indicator or other information. The subscription record may be stored in the mobile station security capability portion 232 of the memory 212 in the home AAA server, under the control of the processing element 230 of processor 210.

In step 304, the mobile station 102 negotiates at least one security capability with the mobile base station. As indicated previously herein, such negotiation may involve, for example, the mobile station identifying its basic security capabilities to the base station in an SBC-REQ message, and the base station responding with an SBC-RSP message indicating which of these security capabilities of the mobile station are also supported by the base station and will therefore be utilized in subsequent security negotiations between them. Also as noted previously, this exchange of SBC-REQ and SBC-RSP messages takes place prior to execution of an EAP authentication process in which the mobile station authenticates itself to the home AAA server via the base station 104 and the ASN gateway 110.

As a more particular example of the negotiation of security capabilities between the mobile station and the base station, assume that there are levels 0-5 of security available in the system and that the base station supports levels 2-4. Thus, if the mobile station is able to support levels 2-5, the negotiated security capability would be at level 4, which is their highest common supported level. Alternatively, if the mobile station is able to support only levels 0-2, the negotiated security capability would be at level 2, which is again the highest common supported level for the mobile station and the base station.

It should be noted in this regard that the term "security capability" as used herein is intended to be construed broadly, so as to encompass, for example, security levels as in the foregoing example, or other types of security capabilities, such as support for particular protocol versions, authorization policies, message authentication code types, authentication types, etc. A given security capability may be viewed as comprising multiple security levels, or each level may correspond to a separate security capability. The present invention is therefore not limited in terms of the particular type and configuration of security capabilities that may be negotiated between the mobile station and the base station.

In step 306, the EAP authentication process is initiated to allow the mobile station to authenticate itself to the system.

Step 308 determines if the EAP authentication process is complete. Once this authentication process is complete, the flow proceeds to step 310.

In step 310, the home AAA server 122 sends information indicating the established mobile station security capabilities to the ASN gateway 120. This information may be sent under the control of the mobile station security capability processing element 230 of the processor 210 in the home AAA server.

In step 312, the ASN gateway 120 verifies that each security capability negotiated between the mobile station 102 and the base station 104 in step 304 is consistent with the corresponding established security capability of the mobile station as communicated to the ASN gateway from the home AAA server 122. Thus, the ASN gateway verifies that the mobile station has actually negotiated the highest security capability or capabilities with the base station based on their common capabilities. In other words, the ASN gateway detects whether or not the mobile station has negotiated at least one lower security capability than that which it would have been entitled to based on its established set of security capabilities. This may be based on an assumption that the ASN gateway has knowledge of the security capabilities of the base stations with which it is associated, although such knowledge is not a requirement of the present invention. Also, general rather than specific knowledge of the base station capabilities may be used. For example, the ASN gateway may have knowledge that its associated base stations all support certain minimum security capabilities. The verification performed in step 312 may be carried out by the mobile station security capability verification element 234 in the processor 200 of the ASN gateway, and may make use of information stored in the mobile station capability storage portion 236 of the memory 202.

Step 314 determines if the negotiated capabilities are consistent with the established capabilities based on the result of the verification step 312 in the ASN gateway 120. An inconsistency indicates the presence of a bidding-down attack, in that the basic security capabilities negotiated between the mobile station and the base station are lower than what would be expected based on the established security capabilities of the mobile station as reflected in the subscription record stored at the home AAA server 122.

If there is no inconsistency, no bidding-down attack has occurred, as indicated in step 316. Under this scenario, the ASN gateway 120 sends information indicative of the established mobile station security capabilities to the base station 104. The base station uses this information to facilitate subsequent security negotiations with the mobile station 102. These subsequent security negotiations may involve, for example, encryption key establishment, and occur after the negotiation of basic security capabilities in step 304.

If there is an inconsistency, a bidding-down attack has been detected, as indicated in step 318. Under this scenario, the ASN gateway 122 takes appropriate defensive action to thwart the attack. For example, the ASN gateway may direct the base station 104 to restart negotiation of basic security capabilities with the mobile station 102 after supplying the base station with the set of established security capabilities for that mobile station. Additional examples of defensive actions will be described below in conjunction with FIG. 4.

The process then continues in a conventional manner, including negotiation of encryption parameters between the mobile station 102 and base station 104, registration of the mobile station with the system, service setup signaling, and establishment of a bearer path.

Figure 4:
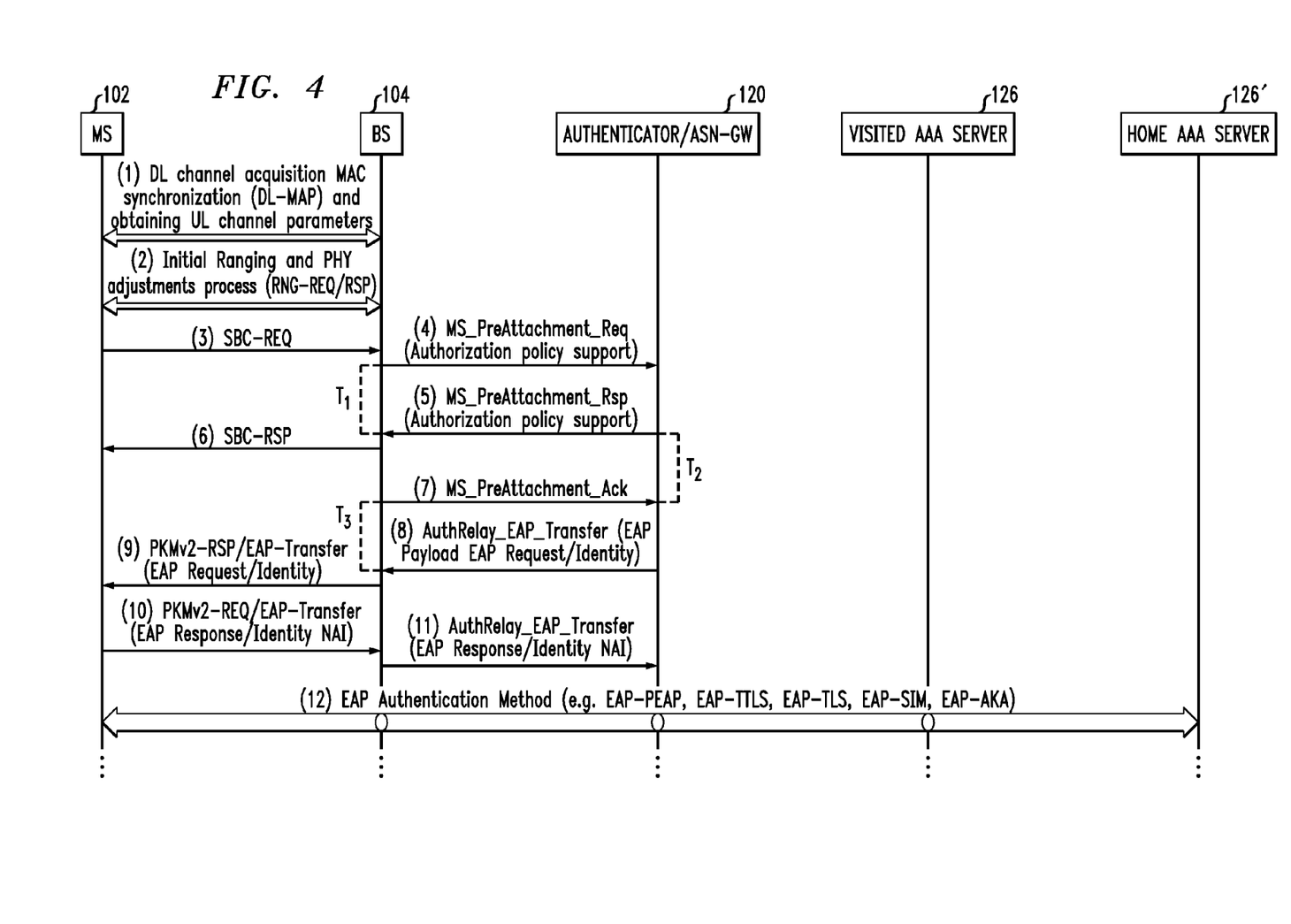
FIG. 4 illustrates a messaging protocol for preventing a bidding-down attack in the FIG. 1 system.

FIG. 4 shows an example of a messaging protocol for implementing the bidding-down attack prevention process of FIG. 3. The protocol includes steps (1) through (29), and involves a mobile station 102, a base station 104, an ASW gateway 120, and two AAA servers 126 and 126'. The ASW gateway is assumed to comprise an authenticator component, which may be implemented at least in part utilizing processor 200 and memory 202. One of the AAA servers is a visited server 126 for the mobile station 102 and the other is a home AAA server 126' for the mobile station 102.

Steps (1) through (29) of FIG. 4 are configured substantially as described in the above-cited IEEE 802.16 and WiMAX Forum documents. Conventional aspects of such steps are well known to those skilled in the art and accordingly will not be described in detail herein. However, the messaging protocol shown in FIG. 4 deviates from the corresponding protocol described in the standards documents through the addition of steps 13(a), 13(b) and 13(c) and a modification of step (16), which collectively implement the above-described functionality for prevention of a bidding-down attack.

In step (1) of the protocol, the mobile station 102 acquires the downlink (DL) channel from the base station 104, MAC synchronization is performed, and the uplink (UL) channel parameters are obtained.

In step (2) of the protocol, an initial ranging and PHY adjustment procedure is performed using RNG-REQ and RNG-RSP messages.

Steps (3) through (7) generally cover initial negotiations of basic capabilities between the mobile station 102 and the base station 104. The SBC-REQ message is sent from the mobile station to the base station in step (3). The message contains configuration support parameters that indicate the mobile station capabilities to the base station. These capabilities include the one or more security capabilities referred to in step 304 of FIG. 3. The mobile station includes specified attributes in the SBC-REQ message, and sets specified bits in each individual attribute, to indicate which particular capabilities it supports.

The configuration support parameters are individually encoded using a message format referred to as type-length-value (TLV). As mentioned previously, the security capabilities may include, for example, PKM version support, authorization policy support, message authentication code type, and EAP authentication type.

The PKM version support parameter indicates support for either or both of PKM Version 1 (PKMv1) and PKM Version 2 (PKMv2). PKMv2 generally provides a higher level of security than PKMv1.

The authorization policy support parameter indicates support for either or both of RSA-based authentication and EAP-based authentication at entry and reentry of the mobile station into the network. The EAP-based authentication generally provides a higher level of security than the RSA-based authentication.

The message authentication code type parameter indicates support for either, both, or none of cipher message authentication code (CMAC) and hashed message authentication code (HMAC) methods of integrity protection for management messages. Several levels of HMAC are specified, from short (less secure) to long (more secure), but CMAC generally provides a higher level of security than HMAC. An indication of "none" will result in no integrity protection of management messages. HMAC is described in greater detail in IETF RFC 2104, "HMAC: Keyed-Hashing for Message Authentication," H. Krawczyk, M. Bellare, R. Canetti, February 1997.

The EAP authentication type parameter is included when the mobile station supports the EAP-based authentication policy. It indicates support for either device authentication or user authentication. User authentication generally provides a higher level of security than device authentication.

The authorization policy support TLV is included in an MS_PreAttachment_Req message sent by the base station 104 to the authenticator at the ASN gateway 120 in step (4). The corresponding ASN gateway capability is returned to the base station in an MS_PreAttachment_Rsp message in step (5).

The base station 104 responds to the SBC-REQ message in step (6) with an SBC-RSP message carrying the same attributes as the SBC-REQ message but with only selected bits set to indicate which of the capabilities supported by the mobile station that the base station will also support.

In step (7), the base station 104 sends an MS_PreAttachment_Ack message to the ASN gateway 120.

This completes the initial negotiation of security capabilities between the mobile station 102 and the base station 104. In a conventional implementation of the FIG. 4 messaging protocol, the ASN gateway 120 cannot verify whether or not the set of negotiated security capabilities reflects the highest possible common configuration supported by both the mobile station and the base station.

Subsequent security negotiations are carried out between the mobile station 102 and the base station 104 in steps (18) through (22) after the mobile station has authenticated itself to the system.

The authentication process in the present embodiment utilizes EAP authentication, involving steps (8) through (13). Conventional aspects of EAP authentication can be found in the IEEE 802.16 and WiMAX Forum documents, and in IETF RFC 3748, "Extensible Authentication Protocol (EAP)," B. Aboba, L. Blunk, J. Vollbrecht, J. Carlson, H. Levkowetz, June 2004. The particular EAP authentication method used may be, for example, EAP-PEAP, EAP-TTLS, EAP-TLS, EAP-SIM or EAP-AKA, all of which are known variants of EAP authentication.

In step (13), success of the EAP authentication is indicated and security context is acquired. This completes the EAP authentication.

Figure 5:
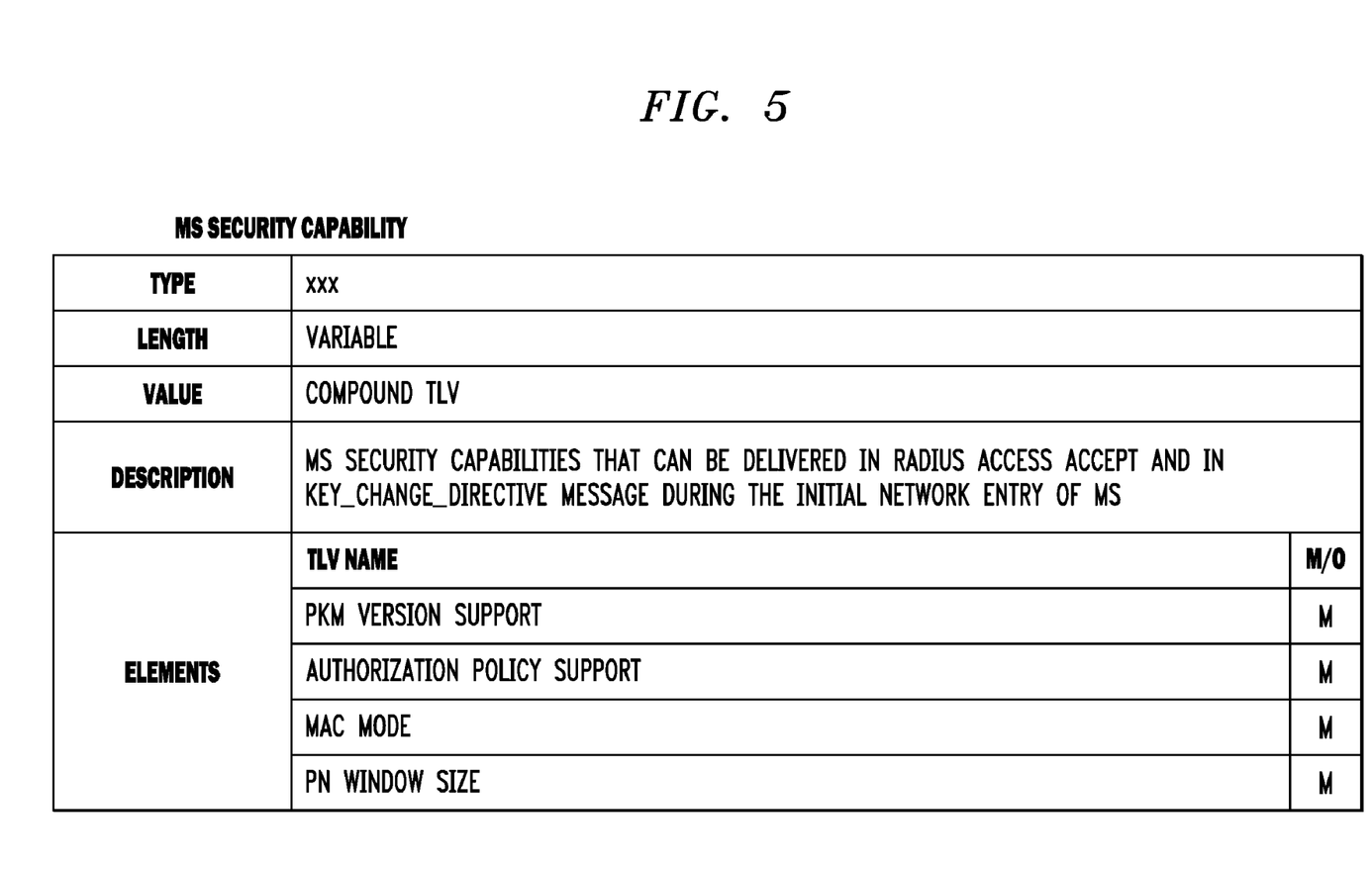
FIG. 5 shows an exemplary format for a mobile station security capabilities message communicated between elements of the FIG. 1 system in the messaging protocol of FIG. 4.

After the EAP authentication is completed, the home AAA server 126' in step (13a) sends a mobile station security capabilities TLV message to the ASN gateway 120. An exemplary format for this TLV message is illustrated in FIG. 5, and in this example includes elements for PKM version support, authorization policy support, message authentication code mode, and packet number (PN) window size. The PN window size is another example of a security capability, and is used to prevent replay attacks. The FIG. 5 diagram includes an indication as to whether each element is mandatory (M) or optional (O), and the four security capability elements shown are each indicated as mandatory. The home AAA server had previously stored information indicative of established security capabilities of the mobile station 104 when that station established a subscription with the home AAA server. The messaging step (13a) corresponds generally to step 310 in the FIG. 3 flow diagram. The home AAA server thus uses its knowledge of the security capabilities of the mobile station to assist the ASN gateway in detecting the presence of a bidding-down attack.

The mobile station security capabilities TLV may be combined with additional information carried from the home AAA server 126' to the ASN gateway 120. For example, the mobile station security capabilities TLV may be combined with Vendor-Specific Attributes (VSAs) included in a RADIUS Access Accept message sent from the home AAA server to the ASN gateway. Details regarding conventional aspects of RADIUS messaging may be found in IETF RFC 2865, "Remote Authentication Dial In User Service (RADIUS)" C. Rigney et al., June 2000. As indicated in the description portion of the FIG. 5 diagram, the mobile station security capabilities TLV may be delivered in the RADIUS Access Accept message.

In step (13b), the ASN gateway 120 reviews the established mobile station security capabilities as signaled in the TLV and compares them with the actual security capabilities negotiated between the mobile station 102 and the base station 104.

If the negotiated capabilities are not in-line with the expected capabilities of the mobile station as indicated by the TLV sent in step (13a), the ASN gateway has determined that a bidding-down attack has taken place, and takes appropriate defensive action to thwart the attack. Such defensive action may include, by way of example, requiring the mobile station to renegotiate the security capabilities with the base station, forcing the mobile station to return to an initial network entry point in the protocol, or even directing the termination of communications with the mobile station. These actions to enforce the established security capabilities of the mobile station are signaled by the ASN gateway to the base station in step (13c). For example, if the defensive action is to terminate communications with the mobile station, step (13c) may comprise a command indicating that an authenticator-initiated network exit procedure should be carried out by the base station.

If the negotiated capabilities are in-line with the expected capabilities of the mobile station 102 as indicated by the TLV sent in step (13a), the ASN gateway 120 has determined that no bidding-down attack has taken place. In this case the ASN gateway sends the mobile station security capabilities TLV to the base station 104 for use in subsequent security negotiations between the mobile station and the base station. More specifically, step (16) is modified to incorporate the mobile station security capabilities TLV into a Key_Change_Directive message sent by the ASN gateway to the mobile station, as is also noted in the description portion of the FIG. 5 diagram. Other types of messaging can be used to communicate this information in alternative embodiments. The base station utilizes the information on the established security capabilities of the mobile station as received from the ASN gateway to facilitate its subsequent security negotiations with the mobile station in steps (18) through (22).

As noted above, conventional aspects of the FIG. 4 messaging process are described in detail in the IEEE Standard 802.16 and WiMAX Forum documents. For example, the time periods $T_1$ through $T_6$ indicate respective expected time periods between sending of certain messages and receipt of other messages, as explained in the above-cited documents.

The illustrative embodiments described above advantageously provide techniques for prevention of bidding-down attacks in a WiMAX system. This functionality can be realized in a simple and efficient manner, with minimal changes to the messaging protocols of the existing WiMAX standards.

Alternative embodiments of the invention can utilize different communication system configurations, attack prevention processes, messaging protocols and message formats than those described above in the context of the illustrative embodiments. These and numerous other alternative embodiments within the scope of the appended claims will be readily apparent to those skilled in the art.

What is claimed is:

1. A method for use in a communication system comprising a mobile station, a base station, a gateway and a server, the base station being configured for wireless communication with the mobile station, the gateway being configured for connection between the base station and the server, the method comprising the steps of:

storing information in the server indicative of at least one established security capability of the mobile station; and sending at least a portion of said information from the server to the gateway;

the gateway thereby being enabled to verify that one or more security capabilities negotiated between the mobile station and the base station are consistent with said at least one established security capability of the mobile station.

2. The method of claim 1 wherein said information stored in the server is configured to enable the gateway to prevent a bidding-down attack in which an attacker impersonates the mobile station to negotiate an inferior security capability with the base station.

3. The method of claim 1 wherein the step of sending at least a portion of said information from the server to the gateway comprises sending at least a portion of said information in conjunction with an authentication process for the mobile station.

4. The method of claim 3 wherein the step of sending at least a portion of said information from the server to the gateway in conjunction with an authentication process for the mobile station further comprises sending said information after said authentication process is completed.

5. The method of claim 1 wherein the step of storing information in the server further comprises creating a subscription record in the server in conjunction with establishment of a subscription between the mobile station and the server and further wherein the subscription record identifies a plurality of security capabilities of the mobile station.

6. The method of claim 1 wherein the information indicative of at least one established security capability of the mobile station comprises a PKM version support indicator.

7. The method of claim 1 wherein the information indicative of at least one established security capability of the mobile station comprises an authorization policy support indicator.

8. The method of claim 1 wherein the information indicative of at least one established security capability of the mobile station comprises a message authentication code type support indicator.

9. The method of claim 1 wherein the information indicative of at least one established security capability of the mobile station comprises an EAP authentication type indicator.

10. A non-transitory computer-readable storage medium having embodied therein executable program code that when executed by a processor of the server implements the steps of the method of claim 1.

11. An apparatus for use in a communication system comprising a mobile station, a base station, and a gateway, the base station being configured for wireless communication with the mobile station, the gateway being configured for connection to the base station, the apparatus comprising:
 a server configured for connection to the gateway such that the gateway is arranged between the base station and the server;
 the server comprising a processor coupled to a memory;
 wherein the server is operative under control of the processor to store in the memory information indicative of at least one established security capability of the mobile station, and to send at least a portion of said information from the server to the gateway;
 wherein said information sent from the server to the gateway enables the gateway to verify that one or more security capabilities negotiated between the mobile station and the base station are consistent with said at least one established security capability of the mobile station.

12. The apparatus of claim 11 wherein the server comprises a home authentication, authorization and accounting server in a connectivity service network of a WiMAX communication system.

13. A method for use in a communication system comprising a mobile station, a base station, a gateway and a server, the base station being configured for wireless communication with the mobile station, the gateway being configured for connection between the base station and the server, the server being configured to store information indicative of at least one established security capability of the mobile station, the method including the steps of:
 the base station negotiating one or more security capabilities with the mobile station;
 receiving in the base station via the gateway at least a portion of said information indicative of at least one established security capability of the mobile station; and
 utilizing the received information to facilitate subsequent security negotiations between the base station and the mobile station.

14. A method for use in a communication system comprising a mobile station, a base station, a gateway and a server, the base station being configured for wireless communication with the mobile station, the gateway being configured for connection between the base station and the server, the server being configured to store information indicative of at least one established security capability of the mobile station, the method including the steps of:
 receiving in the gateway from the server at least a portion of said information indicative of at least one established security capability of the mobile station; and
 verifying in the gateway that one or more security capabilities negotiated between the mobile station and the base station are consistent with said at least one established security capability of the mobile station.

15. The method of claim 14 wherein the verifying step enables the gateway to prevent a bidding-down attack in which an attacker impersonates the mobile station to negotiate an inferior security capability with the base station.

16. The method of claim 14 further comprising the step of sending from the gateway to the base station a message indicating a result of the verifying step.

17. The method of claim 14 further comprising the step of sending from the gateway to the base station a message comprising at least a portion of said information indicative of at least one established security capability of the mobile station for use by the base station in subsequent security negotiations with the mobile station.

18. A non-transitory computer-readable storage medium having embodied therein executable program code that when executed by a processor of the gateway implements the steps of the method of claim 14.

19. An apparatus for use in a communication system comprising a mobile station, a base station, and a server, the base station being configured for wireless communication with the mobile station, the server being configured to store information indicative of at least one established security capability of the mobile station, the apparatus comprising:
 a gateway configured for connection between the base station and the server;
 the gateway comprising a processor coupled to a memory;
 wherein the gateway is operative under control of the processor to receive from the server at least a portion of said information indicative of at least one established security capability of the mobile station, and to verify that one or more security capabilities negotiated between the mobile station and the base station are consistent with said at least one established security capability of the mobile station.

20. The apparatus of claim 19 wherein the gateway comprises an access service network gateway in an access service network of a WiMAX communication system.

* * * * *